United States Patent [19]
Kraus et al.

[11] 3,945,020
[45] Mar. 16, 1976

[54] LIQUID JET RECORDER

[75] Inventors: Helmut Kraus; Walter Distler, both of Erlangen, Germany

[73] Assignee: Siemens Aktiengesellschaft, Erlangen, Germany

[22] Filed: Sept. 27, 1974

[21] Appl. No.: 510,016

[30] Foreign Application Priority Data

Oct. 1, 1973 Germany .......................... 2349239

[52] U.S. Cl. .............................. 346/75; 346/140 R
[51] Int. Cl.² ...................... G01D 15/18; B41J 3/04
[58] Field of Search .............................. 346/75, 140

[56] References Cited

UNITED STATES PATENTS

| | | | |
|---|---|---|---|
| 3,039,438 | 6/1962 | Brown | 346/140 |
| 3,346,869 | 10/1967 | Stone | 346/140 X |
| 3,416,153 | 12/1968 | Hertz | 346/75 |
| 3,673,601 | 6/1972 | Hertz | 346/75 |
| 3,737,914 | 6/1973 | Hertz | 346/75 |
| 3,839,721 | 10/1974 | Chen et al. | 346/75 |

*Primary Examiner*—Joseph W. Hartary
*Attorney, Agent, or Firm*—Haseltine, Lake & Waters

[57] ABSTRACT

A liquid jet recorder with at least one nozzle which is connected to a pressure medium conduit for ejection of an electrically-conductive recording liquid onto a recording carrier, with at least one control electrode of porous material encompassing the liquid jet disintegrating into drops which leads to a suction conduit for the recording liquid, and a signal source for charging of the liquid connectable between the control electrode and the liquid jet for charging the drops so that they repel each other and disintegrate into a vapor cloud adapted to be aspirated through the control electrode. For effecting cleaning of the electrode and its support, the suction pad which is connected to an actuating arrangement, by means of which the suction pad may be moved from an inactive position in which it is located in a spaced relationship to the jet outlet side of the control electrode, so as to be pressed against the jet outlet side and the electrode support.

3 Claims, 2 Drawing Figures

LIQUID JET RECORDER

FIELD OF THE INVENTION

The present invention relates to a fluid or liquid jet recorder.

DISCUSSION OF THE PRIOR ART

A liquid jet recorder with at least one nozzle which is connected to a pressure medium conduit for ejection of an electrically-conductive recording liquid onto a recording carrier, with at least one control electrode of porous material encompassing the liquid jet disintegrating into drops which leads to a suction conduit for the recording liquid, and a signal source for charging of the liquid connectable between the control electrode and the liquid jet for charging the drops so that they repel each other and disintegrate into a vapor cloud adapted to be aspirated through the control electrode, is described in U.S. Pat. No. 3,416,153. This liquid jet recorder allows the jet of the recording liquid between the jet nozzle and the recording carrier to be uninterrupted by a suitable high-voltage which is applied between the recording liquid and the control electrode, whereby practically all drops are received by the control electrode and aspirated therefrom. This, however, creates the problem that during the writing or recording sequence, due to the high outlet velocity of the recording liquid, upon impinging of the liquid on the recording carrier or paper, there is formed a liquid fog. This fog deposits itself on all components located in proximity to the paper and facing towards the paper, namely on the electrode, and also on the support therefore.

SUMMARY OF THE INVENTION

Accordingly, the present invention has as an object to provide a liquid jet recorder which is constructed so that dirtying of the recording carrier through residues of recording liquid on the control electrode and its support due to the forming fog is precluded, and in which residual liquid is fully removed from the control electrode and its support.

The foregoing object is inventively achieved through the use of a suction pad which is connected to an actuating arrangement, by means of which the suction pad may be moved from an inactive position in which it is located in a spaced relationship to the jet outlet side of the control electrode, so as to be pressed against the jet outlet side and the electrode support. In the inventive liquid jet recorder it is possible, at the commencement of each recording sequence, meaning, commencing the recording on a recording carrier, to cleanse the control electrode and its support of residual liquid by means of the suction pad. This cleansing can be fully automatically effected, in a manner, in which the pad is pressed against the control electrode and its support when the carriage supporting the control electrode is returned to its inactive position after completing a recording. The control of the suction pad may also be carried out in a manner, in that prior to commencement of a recording, during the mounting of a recording carrier through a movement of the support means for the recording carrier there is concurrently effected a movement of the suction pad towards the control electrode and its support. Within the scope of the invention, the suction pad may also be associated with a plurality of recording systems which are each constituted of a jet nozzle and control electrode. A plurality of such recording systems are, for example, utilized for color recorders, in which a recording system is employed for each color.

BRIEF DESCRIPTION OF THE DRAWING

Further advantages and details of the invention may now be ascertained from the following description of an exemplary embodiment thereof, taken in conjunction with the accompanying drawing; in which.

DETAILED DESCRIPTION

Figures 1, 2:
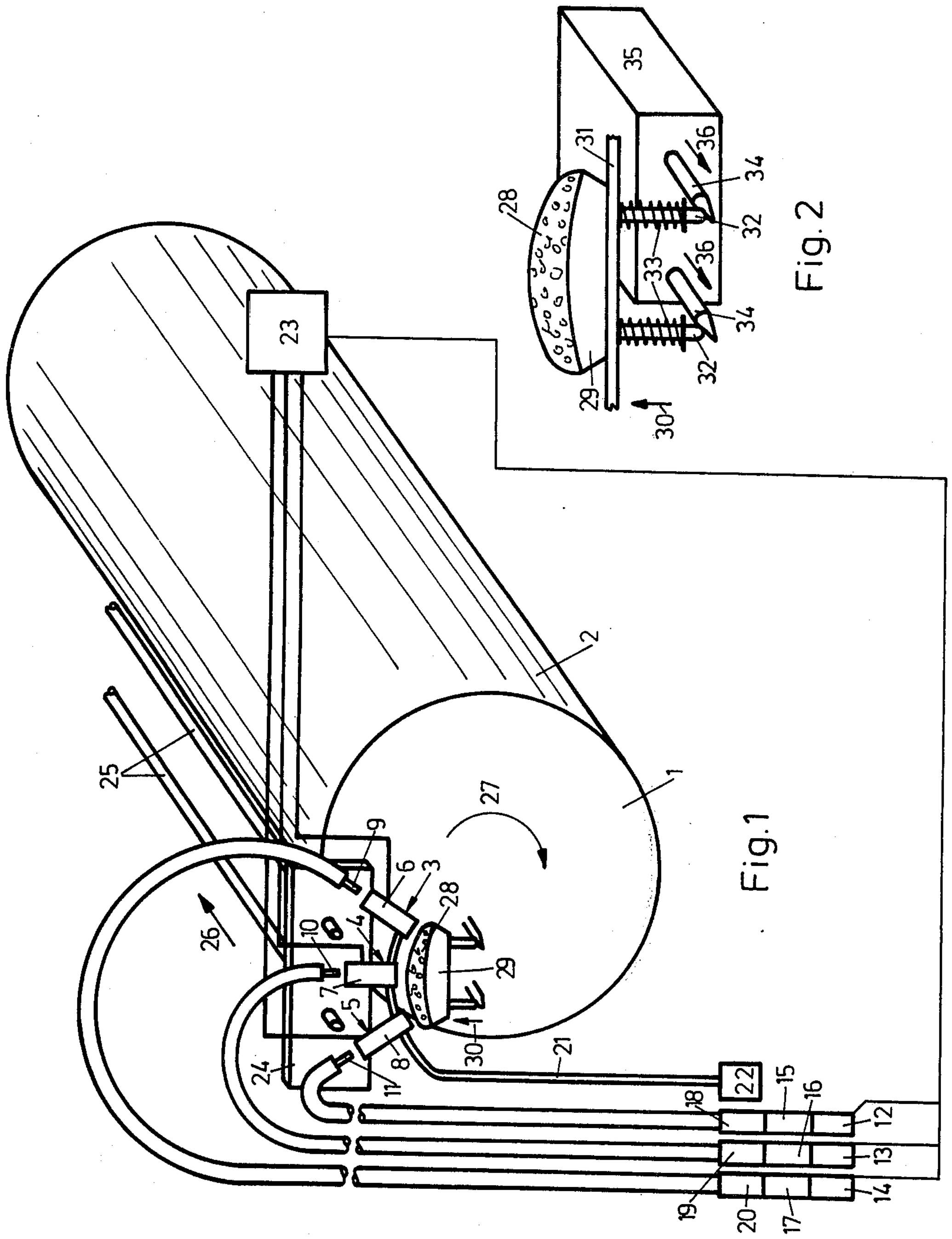
FIG. 1 is a perspective diagrammatic view of the inventive components of a liquid jet recorder according to the invention.
FIG. 2 is an enlarged detail of the liquid jet recorder of FIG. 1.

The fluid or liquid jet recorder, as shown in FIG. 1, includes a drum 1 on which there is stretched or mounted a recording carrier 2 constituted of a sheet of paper. For recording there are employed three recording or scribing systems 3 through 5 which, respectively, consist of a control electrode 6 through 8, and a jet nozzle 9 through 11. The jet nozzles 9 through 11 project the required recording liquid from supply receptacles 12 through 14 through the use of pumps 15 through 17, through the control electrodes 6 through 8. Between the jet nozzles 9 through 11 and pumps 15 and 17 there may also be, respectively, positioned pressure regulators 18 through 20.

The three recording systems serve for the recording or inscribing of three varied colors, for example, the colors blue, red and yellow, so that a colored image is inscribed on the recording carrier 2. The control electrodes 6 through 8 are passed through by the liquid jet ejected from jet nozzles 9 through 11. These liquid jets disintegrate into drops within the tubularly-shaped control electrodes so that, upon application of a high voltage between the control electrodes and the recording liquid, there is produced a vapor cloud. This vapor cloud precipitates on the control electrodes, the latter of which are formed of a porous material, and are then aspirated by a suction conduit 21 through the intermediary of a suction pump 22. The control impulses for the control electrodes 6 through 8 emanate from a control installation 23. If a control impulse is lacking, then a color point is generated on the recording carrier 2; however, if a control impulse is present, then the flow of liquid between the respective jet nozzles 9 through 11 and the recording carrier 2 is interrupted.

The recording systems 3 through 5 are fastened onto a plate 24 which is longitudinally displaceably supported on two rails 25. The recording systems 3 through 5 and the plate 24, in the position shown in FIG. 1, are illustrated in their inactive position away from the recording carrier 2. The recording is carried out in a manner wherein the plate 24 is uniformly moved along rails 25 in the direction of arrow 26 over the entire length of the drum, while the drum 1 is uniformly rotated in the direction of arrow 27, or reversely. The recording thus is effected in a helix-like path on the recording carrier 2. The signals of the control installation 23 contain the image information.

After the completion of a recording or inscription, the plate 24 together with the recording systems 3 through 5, is again moved back into the illustrated inactive or initial position.

In order that residuals or excesses of the recording liquid may be removed from the recording systems 3 through 5, there is provided a suction pad 28 which is supported in a pan 29, and which is commonly associated with the control electrodes 6 through 8. The pan 29 is movable in the direction of arrow 30 in such a manner, whereby the suction pad 28 may be pressed against the jet outlet sides of the electrodes 6 through 8. Due to the elasticity of the suction pad 28, there are also removed recording liquid residuals from the electrode support, in effect, from plate 24.

From FIG. 2 it may be ascertained that the pan 29 in the inactive position thereof is located on a plate 31, so that the suction pad 28 is located at a distance from the jet outlet side of the control electrode 6 through 8. For effecting displacement of the pan 29, there are provided two pins 32 which, while imparting compression to springs 33, are movable in the direction of arrow 30. The movement of pins 32 is carried out through the contact with the conical projections of two pins 34 of an electromagnet 35. When the pins 34 move in the direction of arrow 36, the pan 29 concurrently moves in the direction of arrow 30.

The electromagnet 35 can be connected with mounting arrangement (not shown) for the recording carrier 2 on the drum so that, upon each removal or mounting of the recording carrier 2 onto the drum, through intermediary of the electromagnet 35, on the one hand, is actuated the mounting mechanism and, on the other hand, the pan 29 with the suction pad 28. Within the scope of the invention, the control of the electromagnet 35 may, however, also be carried out electrically by hand, or automatically at other time points of the operating cycle.

While there has been shown what is considered to be the preferred embodiment of the invention, it will be obvious that modifications may be made which come within the scope of the disclosure of the specification.

What is claimed is:

1. In a liquid jet recorder having at least one jet nozzle; a pressure means conduit connected to said jet nozzle for causing the latter to propel a jet of an electrically-conductive recording liquid onto a recording carrier; at least one control electrode formed of a porous material communicating with a suction conduit for aspirating said recording liquid, said electrode encompassing the liquid jet during disintegrating thereof into drops; and a signal source connected to said control electrode and being actuatable between said control electrode and said recording liquid jet for charging said drops so as to be mutually repellent and disintegrate into a vapor cloud aspirated by said control electrode, the improvement comprising: a suction pad; actuating means operatively connected to said suction pad for conveying said suction pad from an inoperative position at a distance from the jet outlet side of said control electrode into compressive engagement with said electrode jet outlet side and with a support for said electrode.

2. A recorder as claimed in claim 1, comprising a plurality of recorder systems each including at least one jet nozzle and control electrode, said suction pad being jointly associated with all of the control electrodes of said recorder systems.

3. A recorder as claimed in claim 1, comprising a pan supporting said suction pad, said actuating means including an electromagnet adapted to move said pan between said suction pad operative and inoperative positions.

* * * * *